US009485218B2

(12) United States Patent
Harp et al.

(10) Patent No.: US 9,485,218 B2
(45) Date of Patent: Nov. 1, 2016

(54) DEVICE FOR PREVENTING, DETECTING AND RESPONDING TO SECURITY THREATS

(75) Inventors: Steven Alex Harp, Coon Rapids, MN (US); J Thomas Haigh, Golden Valley, MN (US); Johnathan A Gohde, Arden Hills, MN (US); Richard C O'Brien, Brooklyn Park, MN (US); Charles N Payne, Jr., Stillwater, MN (US); Ryan A VanRiper, Bloomington, MN (US)

(73) Assignee: Adventium Enterprises, LLC, Minneapolis, MN (US)

( * ) Notice: Subject to any disclaimer, the term of this patent is extended or adjusted under 35 U.S.C. 154(b) by 1767 days.

(21) Appl. No.: 12/730,201

(22) Filed: Mar. 23, 2010

(65) Prior Publication Data

US 2011/0238979 A1   Sep. 29, 2011

(51) Int. Cl.
*H04L 29/06* (2006.01)

(52) U.S. Cl.
CPC ......... *H04L 63/0227* (2013.01); *H04L 63/102* (2013.01); *H04L 63/1441* (2013.01); *H04L 63/0281* (2013.01); *H04L 63/0853* (2013.01); *H04L 63/164* (2013.01)

(58) Field of Classification Search
None
See application file for complete search history.

(56) References Cited

U.S. PATENT DOCUMENTS

| | | | |
|---|---|---|---|
| 5,483,596 A | 1/1996 | Rosenow et al. | |
| 5,499,297 A | 3/1996 | Boebert | |
| 5,724,426 A | 3/1998 | Rosenow et al. | |
| 5,896,499 A | 4/1999 | McKelvey | |
| 5,940,591 A | 8/1999 | Boyle et al. | |
| 5,968,176 A | 10/1999 | Nessett et al. | |
| 6,003,084 A | 12/1999 | Green et al. | |
| 6,067,620 A | 5/2000 | Holden et al. | |
| 6,182,226 B1 | 1/2001 | Reid et al. | |
| 6,209,101 B1 | 3/2001 | Mitchem et al. | |
| 6,219,707 B1 | 4/2001 | Gooderum et al. | |
| 6,304,973 B1 | 10/2001 | Williams | |
| 6,321,336 B1 | 11/2001 | Applegate et al. | |

(Continued)

FOREIGN PATENT DOCUMENTS

WO      02/095543 A2      11/2002

OTHER PUBLICATIONS

Haigh, "Trapping Malicious Insiders in the SPDR Web", System Sciences, Jan. 2009, 42nd Hawaii International Conference ON, pp. 1-10.*

(Continued)

*Primary Examiner* — Benjamin Lanier
(74) *Attorney, Agent, or Firm* — Brooks, Cameron & Huebsch, PLLC

(57) ABSTRACT

A device to prevent, detect and respond to one or more security threats between one or more controlled hosts and one or more services accessible from the controlled host. The device determines the authenticity of a user of a controlled host and activates user specific configurations under which the device monitors and controls all communications between the user, the controlled host and the services. As such, the device ensures the flow of only legitimate and authorized communications. Suspicious communications, such as those with malicious intent, malformed packets, among others, are stopped, reported for analysis and action. Additionally, upon detecting suspicious communication, the device modifies the activated user specific configurations under which the device monitors and controls the communications between the user, the controlled host and the services.

17 Claims, 4 Drawing Sheets

(56) References Cited

U.S. PATENT DOCUMENTS

| | | | |
|---|---|---|---|
| 6,332,195 B1 | 12/2001 | Green et al. | |
| 6,453,419 B1 | 9/2002 | Flint et al. | |
| 6,775,694 B1 | 8/2004 | Fougerat | |
| 7,069,437 B2 | 6/2006 | Williams | |
| 7,079,007 B2* | 7/2006 | Siegel et al. | 340/5.52 |
| 7,162,630 B2 | 1/2007 | Sperry et al. | |
| 7,263,719 B2 | 8/2007 | Jemes et al. | |
| 7,308,702 B1 | 12/2007 | Thomsen et al. | |
| 7,346,922 B2* | 3/2008 | Miliefsky | 726/3 |
| 7,370,356 B1 | 5/2008 | Guo | |
| 7,441,118 B2 | 10/2008 | Lawman et al. | |
| 7,464,407 B2* | 12/2008 | Nakae et al. | 726/22 |
| 7,490,350 B1* | 2/2009 | Murotake | G06F 21/85 726/11 |
| 7,526,792 B2 | 4/2009 | Ross | |
| 7,536,715 B2 | 5/2009 | Markham | |
| 7,937,759 B2* | 5/2011 | Wu et al. | 726/22 |
| 2002/0040439 A1* | 4/2002 | Kellum | G06F 21/567 726/26 |
| 2003/0051026 A1* | 3/2003 | Carter et al. | 709/224 |
| 2004/0255167 A1* | 12/2004 | Knight | 713/201 |
| 2005/0210253 A1 | 9/2005 | Shigeeda | |
| 2006/0053491 A1 | 3/2006 | Khuti et al. | |
| 2007/0199061 A1 | 8/2007 | Byres et al. | |
| 2009/0063869 A1 | 3/2009 | Kohavi et al. | |
| 2010/0037296 A1* | 2/2010 | Silverstone | 726/3 |

OTHER PUBLICATIONS

Charles Payne, Jr., Richard C. O'Brien, J. Thomas Haigh, "The Case for Prevention-based, Host-resident Defenses in the Modern PCS Network", Cyber Security and Information Intelligence Research Workshop (CSIIRW 2009), Oak Ridge, TN, Apr. 13, 2009.

Richard C. O'Brien, Charles N. Payne, Jr., "Virtual Private Groups for Protecting Critical Infrastructure Networks", Cyber Security Applications and Technology Conference for Homeland Security, Washington, DC, Mar. 3, 2009.

"Global Command Center" Product Overview; Secure Computing Corporation; 4810 Harwood Road; San Jose, CA 95124; USA.

"Symantec™ Client Security Administrator's Guide" Documentation version 1.1; Copyright © 2003 Symantec Corporation; 20330 Stevens Creek Blvd.; Cupertino, CA 95014; USA.

"Symantec™ Client Security Client Guide" Documentation version 1.1; Copyright © 2003 Symantec Corporation; 20330 Stevens Creek Blvd.; Cupertino, CA 95014; USA.

"CyberGuard SG User Manual", Revision 2.1.5, Jun. 7, 2005; CyberGuard; 7984 South Welby Park Drive, Suite 101; Salt Lake City, Utah 84084.

"McAfee UTM (Unified Threat Management) Firewall" Solutions Brief; McAfee, Inc.; 3965 Freedom Circle; Santa Clara, CA 95054; USA http://mcafee.com/us/enterprise/products/network_security/utm_firewall.html.

"McAfee Secure Firewall CommandCenter"; McAfee, Inc.; 3965 Freedom Circle; Santa Clara, CA 95054; USA http://securecomputing.com/index.cfm?skey=1760&lang=en.

J. Thomas Haigh, et al., Trapping Malicious Insiders in the SPDR Web, Proceedings of the 42nd Hawaii International Conference on System Sciences, 2009 (10 pgs).

International Search Report and Written Opinion for related PCT Application PCT/US2001/000529, mailed Jun. 24, 2011 (15 pgs.).

European Examination Report for related European Application No. 11713390.0, dated Oct. 10, 2015, 6 pages.

* cited by examiner

DEVICE FOR PREVENTING, DETECTING AND RESPONDING TO SECURITY THREATS

GOVERNMENT RIGHTS

The subject matter of this disclosure was made with government support under Contract Number FA8750-07-C-0017 awarded by the United States Air Force. Accordingly, the U.S. Government has certain rights to subject matter disclosed herein.

TECHNICAL FIELD

The invention relates to security and safety of computer networks and computers.

BACKGROUND

In order to block intruders, computer networks have traditionally relied on a physical separation between the computer network and other networks and devices. Defenses located at the boundary of a computer network are unable to mediate secure access between controlled hosts they are trying to protect and the services that are accessible from the controlled host. As such, an intruder who gains a foothold on a controlled host can not be blocked from malicious activities.

U.S. Patent Application Publication No. 2007/0199061 (Byres et al.) teaches a network security appliance for providing security to end-point devices such as a node in an industrial environment. However, the appliance does not provide user authentication that is independent of the device being protected, and it does not provide security protections to traffic between devices being protected.

U.S. Pat. No. 7,536,715 (Markham) teaches a network interface card installed in a computer to protect the computer in which the card is installed and to protect the card itself. However, the device does not provide user authentication that is independent of the computer being protected.

In view of the foregoing, there exists a need for devices providing sophisticated prevention, detection and response capabilities against security threats.

SUMMARY

The present invention is a device to prevent, detect and respond to one or more security threats between a controlled host and one or more services connected to the controlled host. In an embodiment of the invention, the device collects information for authenticating a user of the controlled host and compares the collected information with the information for one or more user permitted to use the controlled host. If the information for the user of the controlled host matches the information for the one or more user permitted to use the controlled host, then the user is designated as an authorized user. Otherwise, the user is designated as an unauthorized user. The one or more configurations assigned for the authorized or unauthorized user of the controlled host is then activated by the device for controlling the communication between the controlled host and the one or more services. Additionally, the activated configurations also include those for identifying and preventing malicious intent.

The device includes a mechanism for cryptographically ensuring the privacy and integrity of communications between the controlled host and the one or more services. The communication is configured into one or more packets and the packets are evaluated against the rules and filters included in one or more utilities such as internet protocol tables, media access control address filters, address resolution protocol, network intrusion detection system, proxy server, and security protocol. As such, the device detects suspicious communications such as those with malicious intent, malformed packets, unauthorized activities, etc. Suspicious communications are stopped and their characteristics are logged, reported and analyzed. Suspicious communications are also used to modify the activated configurations under which the device controls the communication between the controlled host and the one or more services. The communication between the controlled host and the one or more services is compared with the activated configuration for compliance. Compliant communications are permitted to proceed and non-compliant communications are stopped.

DETAILED DESCRIPTION

While the present invention is subject to various modifications, embodiments illustrating the best mode contemplated for carrying out the invention are described in detail herein below by way of examples with reference to the included drawings. While multiple embodiments of the instant invention are disclosed, still other embodiments may become apparent to those skilled in the art. It should be clearly understood that there is no intent, implied or otherwise, to limit the invention in any form or manner to that disclosed herein. As such, all alternative embodiments of the invention are considered falling within the spirit, scope and intent of the disclosure as defined by the appended claims.

Figure 1:
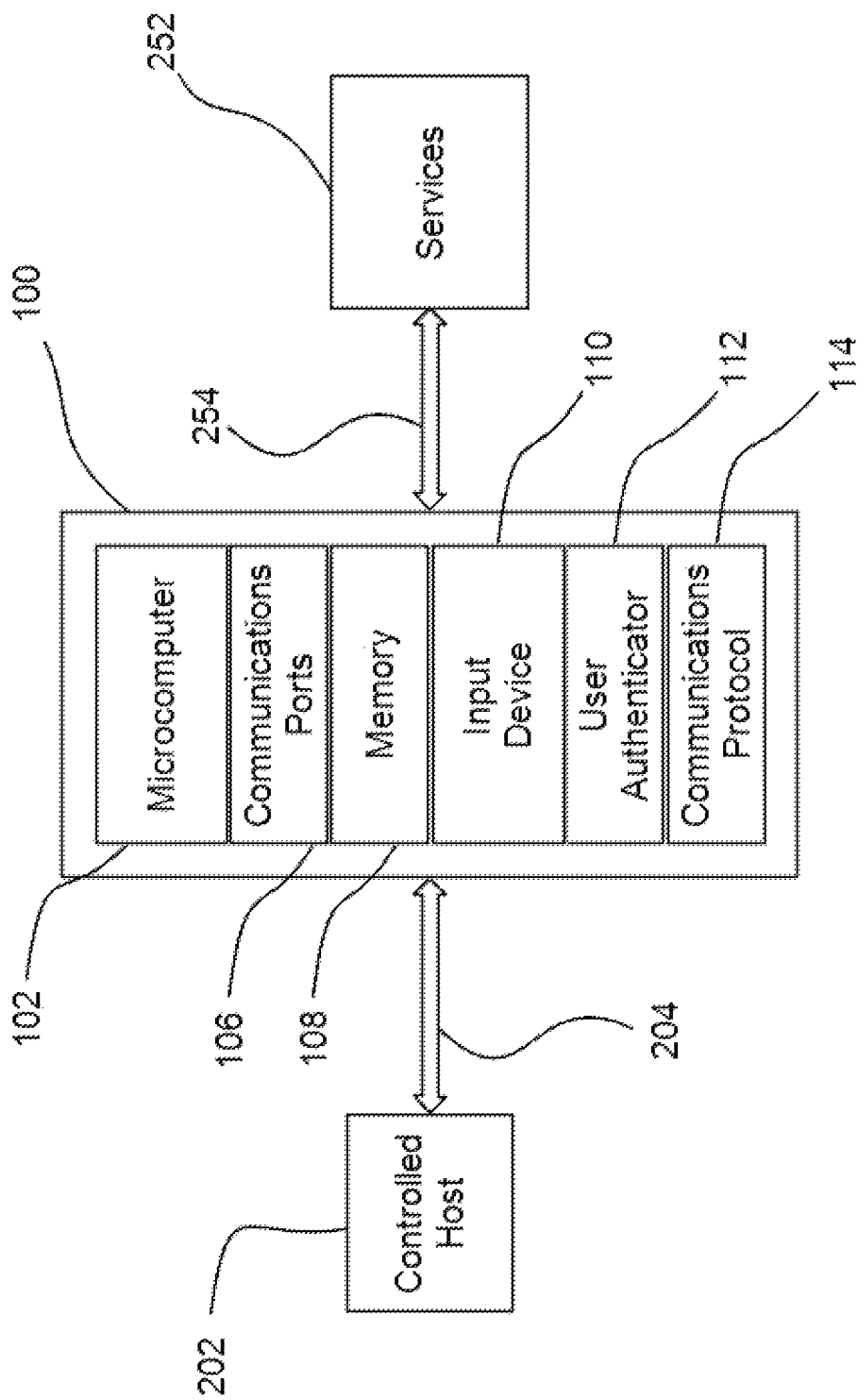
FIG. 1 is a block diagram of an embodiment of the invention.

With reference to FIG. 1, device 100, in accordance with an embodiment of the invention, prevents, detects and responds to one or more security threats between controlled host 202 and services 252 available to a user of controlled host 202. Device 100 includes microcomputer 102, one or more communications ports 106, memory 108, input device 110, user authenticator 112 and communications protocol 114. As used herein, and unless stated otherwise, communications protocol 114 refers to a means for monitoring and regulating communications between controlled host 202 and services 252.

In an embodiment of the invention, device 100 is an inline device. In another embodiment, device 100 is embedded within controlled host 202. In an alternate embodiment, device 100 is a bump-in-the-wire device. In yet another embodiment, device 100 is a virtual device on controlled host 202. In an embodiment of the invention, device 100 includes anti-tamper or other security features to enforce and enhance the isolation of device 100 from controlled host 202 and services 252.

Device 100 monitors all communications between controlled host 202 and services 252. As such, device 100 prevents, detects and responds to security threats independent of the source and/or destination of the security threats. Security threats include any attack, failure, mistake, or other action by services 252 on controlled host 202. Security threats also include any attack, failure, mistake, or other action by controlled host 202 on services 252. Accordingly, device 100 prevents, detects and responds to security threats initiated from controlled host 202 and destined for one or more services 252. Alternatively, device 100 prevents, detects and responds to security threats initiated from one or more services 252 and destined for controlled host 202.

In an embodiment of the invention, device 100 includes communications ports 106 for connecting device 100 to controlled host 202 and services 252. As shown in FIG. 1, communications channels 204 and 254 respectively connect device 100 to controlled host 202 and services 252. Communications channels 204 and 254 include, for example, one or more cross over cables, universal serial bus (USB) connections, serial cables, parallel cables, and wireless connectivity. Alternate means for communications channels 204 and 254 will be apparent to one skilled in the art. All such alternate communications channels are considered to be within the scope, spirit and intent of the instant invention.

In device 100, memory 108 serves the typical purpose and function as in any microcomputer based device as is well known in the art. For instance, memory 108 contains information pertaining to one or more users who are permitted to use controlled host 202. Memory 108 also contains information such as one or more configurations for each user of controlled host 202. Additionally, memory 108 includes information and instructions for operating microcomputer 102 and device 100. Memory 108 also contains the functional instructions for communications protocol 114 as described herein with reference to FIG. 2.

Input device 110 is used for collecting information for authenticating a user of controlled host 202, which information is processed by user authenticator 112 to identify the user of controlled host 202, and to activate a configuration for that user. In an embodiment of the invention, input device 110 is one or more of a smart card reader, a biometric device, a retina scanner, a finger print scanner, a palm print scanner, and a face scanner. Alternate forms of input device 110 for collecting information for authenticating the user of controlled host 202 will be apparent to one skilled in the art. All such alternate forms of input device 110 for collecting information for authenticating the user of controlled host 202 are considered to be within the scope, spirit and intent of the instant invention.

User authenticator 112 compares the information collected about the user of controlled host 202, as obtained through input device 110, with the information for one or more user permitted to use controlled host 202. If the information about the user of controlled host 202, as obtained through input device 110, matches the information for one or more user permitted to use the controlled host 202, then user authenticator 112 designates the user of controlled host 202 as an authorized user. However, if the information about the user of controlled host 202, as obtained through input device 110, does not match the information for one or more user permitted to use the controlled host 202, then user authenticator 112 designates the user of controlled host 202 as an unauthorized user.

As can be seen, input device 110 and user authenticator 112 in an embodiment of device 100 are independent from controlled host 202. Such an embodiment prevents tampering or circumvention of device 100.

Figure 2:
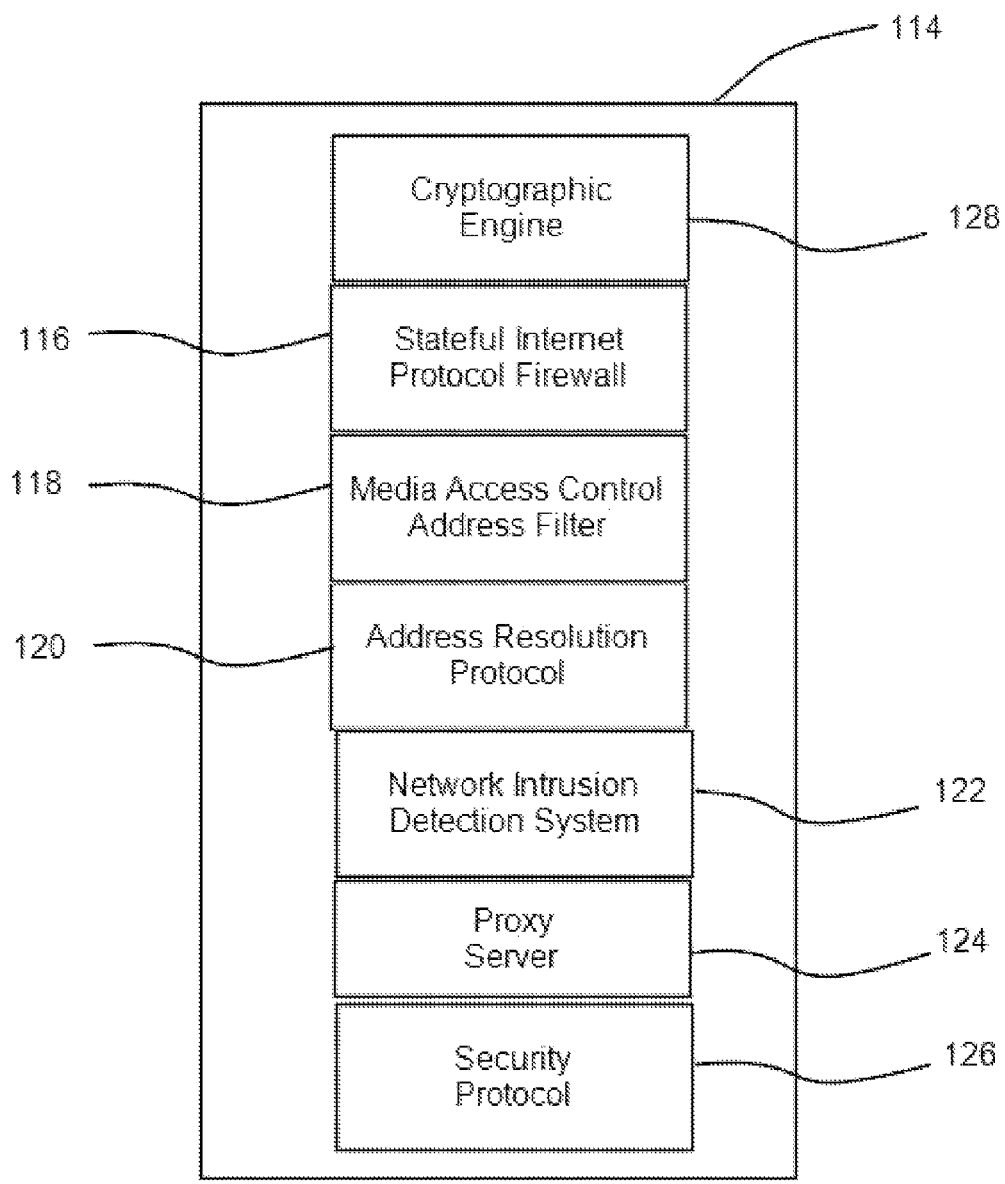
FIG. 2 is a block diagram of an embodiment of the communications protocol in accordance with an embodiment of the invention.

In an embodiment of the invention, device 100 includes communications protocol 114 comprising means for controlling communication between controlled host 202 and services 252. As illustrated in FIG. 2, an embodiment of communications protocol 114 includes cryptographic engine 128, stateful internet protocol firewall 116, media access control address filter 118, address resolution protocol 120, network intrusion detection system 122, proxy server 124 and security protocol 126.

Cryptographic engine 128 encrypts all communications and negotiates the cryptographic keys used between controlled host 202 and services 252. As such, cryptographic engine 128 cryptographically ensures the privacy and integrity of communications between controlled host 202 and services 252. All communications are monitored to ensure any rogue connection is blinded. As such, only encrypted communications are permitted by device 100 and only device 100 possesses the cryptographic keys required for accessing service 252 to and from controlled host 202.

Stateful internet protocol firewall 116 contains chains of rules for the treatment of all communications packets between controlled host 202 and service 252. As such, device 100 has the ability to monitor the state of a connection and redirect, modify or stop communications packets based on the state of the connection, not just on the source, destination or data content of the packet. Each communications packet arriving at or leaving controlled host 202 is processed by sequentially traversing the chain of rules and each packet traverses at least one chain. Each rule in a chain contains a specification corresponding to each communication packet. As a packet traverses a chain, each rule in turn is examined. If a rule does not match the packet, the packet is passed to the next rule. If a rule does match the packet, the rule takes the action indicated by the specification, which may result in the packet being allowed to be transmitted or it may not. The packet continues to traverse the chain until either a rule matches the packet and decides the ultimate fate of the packet or the end of the chain is reached. If the end of the chain is reached without any match between the communications packet and the rules in the chain, device 100 prevents transmission of the communications packet.

Media access control addresses are unique identifiers assigned to most network adapters or network interface cards. Media access control address filter 118 filters media access control addresses and performs stateful, deep-packet inspection on its interface to controlled host 202 and its interface to services 252.

Address resolution protocol 120 is a computer networking protocol for determining a network host's link layer or hardware address when only its internet layer or network layer address is known. In an embodiment of the invention, address resolution protocol 120 includes the address resolution protocol tables for maintaining the address resolution protocol packet filter rules. The address resolution protocol tables utility is used to create, update and view the tables that contain the filtering rules, similar to the previously described stateful internet protocol firewall 116.

Network intrusion detection system 122 detects security threats and attacks launched from controlled host 202 such as for instance by a malicious insider. In an embodiment of communications protocol 114, network intrusion detection system 122 performs protocol analysis, content searching, content matching, packet logging, and real-time traffic analysis. Network intrusion detection system 122 includes both network intrusion prevention systems and network intrusion detection systems for actively blocking and/or passively detecting a variety of attacks and probes such as buffer overflows, stealth port scans, web application attacks, server message block probes, operating system fingerprinting attempts, amongst other features.

Proxy server 124 in an embodiment of communications protocol 114 acts as an intermediary for requests from clients seeking resources from providers. During any communication on a computer network, the client is controlled host 202 and the provider is services 252. Alternatively, during a different communication, the client is services 252 and the provider is controlled host 202. When the client requests some service from the provider, proxy server 124 evaluates the request according to its filtering rules. If the request is validated, proxy server 124 provides the resources by connecting to the relevant provider and requesting the service on behalf of the client. In an embodiment of device 100, proxy server 124 controls and manipulates all network communication associated with an application running on controlled host 202. Proxy server 124 compares the communication against the one or more activated configuration and permits the communication to complete if there is a match. Communication that does not match the one or more activated configuration is stopped and not permitted to proceed. As such, proxy server 124 detects and blocks malformed communication and alerts other security or monitoring components about such communication. Proxy server 124 also monitors the legitimacy of the communication to and from controlled host 202. Communication not conforming to the rules of proxy server 124 are stopped and not permitted to proceed. In an embodiment of device 100, proxy server 124 maintains the anonymity of the client and/or the provider, speeds up access to resources, applies access policies to services 252 or to the content of the communication, logs and/or audits usage, amongst other functions.

As shown in FIG. 2, an embodiment of communications protocol 114 includes security protocol 126 for securing internet protocol communications by authenticating and encrypting the communication into one or more packets of data streams. Security protocol 126 also includes protocols for establishing mutual authentication between a client and a provider at the beginning of the session. During any communication on a computer network, the client is controlled host 202 and the provider is services 252. Alternatively, during a different communication, the client is services 252 and the provider is controlled host 202. Security protocol 126 is used to protect data flow between a client and a provider using encryption to ensure that any rogue connection between controlled host 202 and services 252 is blinded. In an embodiment of the invention, security protocol 126 is the Internet Protocol Security (IPSec) as is well known in the art.

As described in the foregoing with reference to FIGS. 1 and 2, an embodiment of device 100 of the instant invention includes one or more mechanisms to control and manipulate communication between controlled host 202 and services 252. In an embodiment of device 100, memory 108 contains one or more configurations for each authorized user of controlled host 202. Each configuration specifies how controlled host 202 can be used by each user and further specifies the one or more services 252 that are accessible to that user.

In operation, device 100 uses input device 110 and user authenticator 112 in combination to identify the user of controlled host 202 as either an authorized user or an unauthorized user. Until device 100 identifies the user as an authorized user, communications protocol 114 activates the configurations that provide only limited access to services 252 from controlled host 202. For example, configurations enforcing a strict concept of "least privilege" are used. Alternatively, network connectivity is turned off or user inputs on controlled host 202 are not processed. Alternate embodiments of device 100 can activate configurations that provide limited access to the network or services 252 when no authorized user has been identified. For example support tasks and house-keeping functions such as back-up and patch management are permitted. In other embodiments, the activated configurations direct device 100 to ban a user from, for example, using one or more controlled hosts 202 or one or more services 252. In another embodiment, the activated configurations direct device 100 to block network access from one or more controlled host 202 or from one or more services on controlled host 202.

Once the user has been identified, communications protocol 114 activates configurations in accordance with the identity of the user of controlled host 202. Such user specific configurations include, for example, filtering rules, monitoring rules, authorization rules and proxy configuration. Communications protocol 114 further activates configurations that define rogue connections and communications with malicious intent. If the authorized user is a system or network administrator, the configurations permit, for example, tasks related to auditing or tasks pertaining to security monitoring and enforcement or tasks associated with maintaining configurations for authorized users or configurations for identifying malicious communications. To one skilled in the art, it will be apparent that communications protocol 114 can activate additional, fewer, or different configurations under which device 100 prevents, detects and responds to security threats. All such alternative embodiments are considered to be within the spirit, scope and intent of the present invention. As can be seen, by activating user specific configurations, device 100 authorizes only the services 252 required by the user, the user's role, or other user specific discriminators.

Device 100 monitors and encrypts all communications between controlled host 202 and services 252 to ensure any rogue connection is blinded. As such, only encrypted communications are permitted by device 100 and only device 100 possesses the cryptographic keys required for accessing service 252 to and from controlled host 202. Accordingly, device 100 cannot be bypassed because all communication is consistent with the user-based network authorization policies enforced by device 100, and all communication is examined by device 100 for malicious content and/or intent. Information pertaining to such malicious communications is sent to the security and monitoring components of device 100 for examining the attributes of attacks and for implementing corrective actions. Authentication records from device 100 provide information such as which users were apparently present and which controlled host 202 the users were using before or during a particular series of events, time frame, or other criteria. For example, an attempt to transmit a maliciously crafted communication is detected by proxy server 124 and attributed to service 252 and controlled host 202 that caused the inconsistency. Network intrusion detection system 122 detects attempts to probe the network and identify where the scans originated from.

In accordance with an embodiment of the invention, device 100 checks the integrity of communications between controlled host 202 and services 252 while preserving message metadata to help identify the nature, source and cause of a failure such as for example, the user, controlled host 202, or service 252 responsible for the failure. Failures can include, but are not limited to, compromised or corrupted data or other inputs. Failures can also result from a delay in providing inputs or outputs. Accordingly, device 100 inspects each communication and sends the metadata about the message to security and monitoring components.

Alternate embodiments of device 100 play a key role in activities such as mitigating threats from one or more of a user, controlled host 202, services 252, and the nature of the communication between controlled host 202 and services 252. In such embodiments, responses by device 100 are determined based on the activated configuration or are directed by the network security and monitoring components. For instance, device 100 reports such activities to the network security and monitoring component which, for example, conducts additional analysis of such activities. The network security and monitoring components apply reasoning to such activities and the extent to which any activity indicates malicious intent by one or more of the user, controlled host 202, services 252, the nature of the communication between controlled host 202 and services 252. For activities determined to be suspicious and/or having malicious intent, the activated configurations are modified thereby changing the operation of device 100. Such changes to the operation of device 100 include isolating controlled host 202, isolating services 252, and preventing the user from using controlled host 202 and/or accessing services 252. In some embodiments, the network security and monitoring component of device 100 alerts a system administrator or a duty officer to investigate the suspicious activities. Accordingly, device 100 assures users engage only in authorized actions and thereby reduces the range of activities that can be performed by a malicious insider and simplifies analysis (manual or automated) of user activities.

Other embodiments of device 100 enable monitoring and tracking of a user's conformance (or not) to that user's known patterns of operation and workflows by reporting the user's activities between controlled host 202 and services 252. Alternate embodiments of device 100 enable the network security and monitoring components detect when any activity fails to register completion by its deadline (or is started out of order) and report such failures.

While FIG. 1 shows one controlled host 202 and one service 252 respectively connected to device 100 via communications channels 204 and 252, it should be understood that FIG. 1 illustrates one of many possible embodiments of network configurations wherein device 100 prevents, detects and responds to one or more security threats. Alternate embodiments of network configurations for device 100 are described herein below with reference to FIGS. 3 through 8, inclusive.

Figure 3:
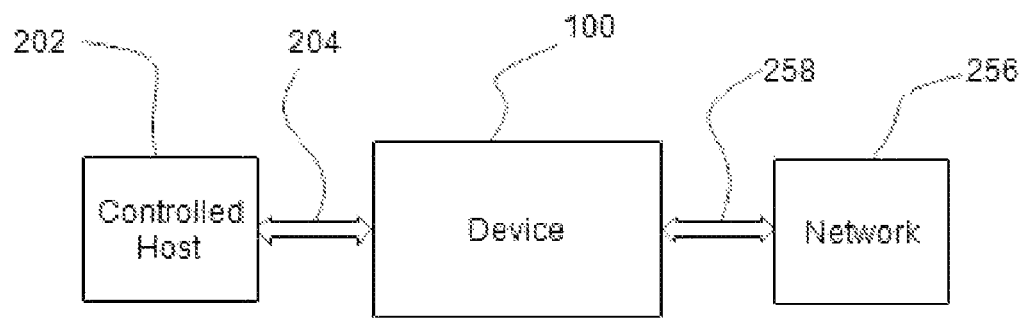
FIG. 3 is a block diagram of another embodiment of the invention.

FIG. 3 illustrates an embodiment of a network configuration wherein controlled host 202 and network 256 are respectively connected to an embodiment of device 100 via communications channels 204 and 258. Accordingly, device 100 prevents, detects and responds to one or more security threats between controlled host 202 and network 256.

Figure 4:
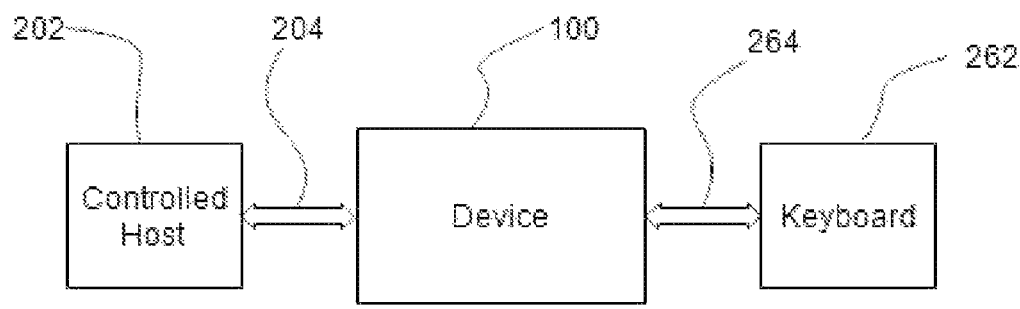
FIG. 4 is a block diagram of yet another embodiment of the invention.

FIG. 4 illustrates another embodiment of a network configuration wherein controlled host 202 and keyboard 262 are respectively connected to an embodiment of device 100 via communications channels 204 and 264. Accordingly, device 100 prevents, detects and responds to one or more security threats between controlled host 202 and keyboard 262.

Figure 5:
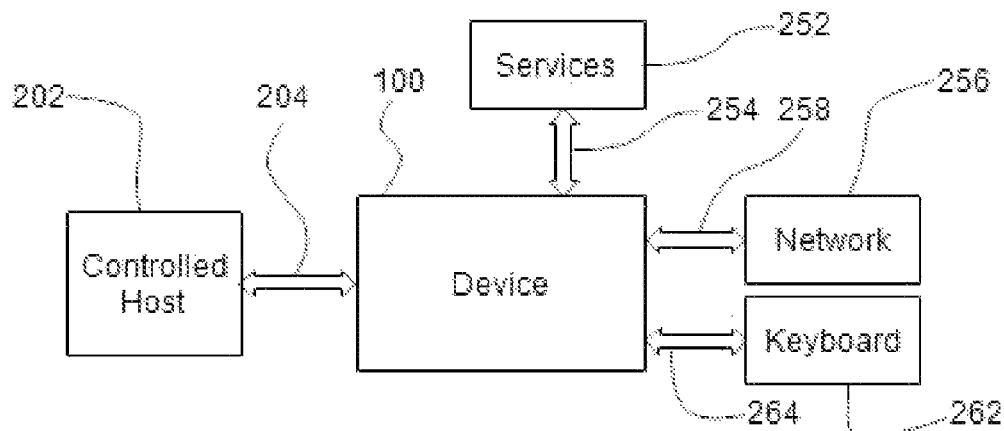
FIG. 5 is a block diagram of an alternate embodiment of the invention.

FIG. 5 illustrates an alternate embodiment of a network configuration wherein communications channels 204, 254, 258 and 264 respectively connect device 100 to controlled host 202, services 252, network 256 and keyboard 262. Accordingly, device 100 prevents, detects and responds to one or more security threats between controlled host 202 and services 252, network 256 and keyboard 262. Additionally, in an alternate embodiment of the network configuration of FIG. 5, device 100 further prevents, detects and responds to one or more security threats, for example, between keyboard 262 and network 256, between keyboard 262 and services 252, between network 256 and services 252, amongst others.

Figure 6:
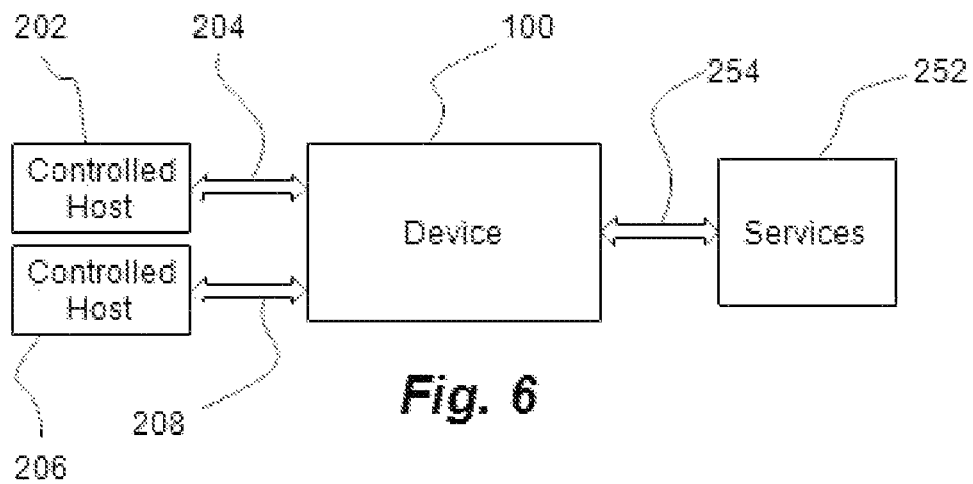
FIG. 6 is a block diagram of another embodiment of the invention.

FIG. 6 illustrates yet another embodiment of a network configuration wherein device 100 is respectively connected to controlled host 202, controlled host 206 and services 252 via communications channels 204, 208 and 254. Accordingly, device 100 prevents, detects and responds to one or more security threats between controlled host 202 and services 252 and between controlled host 206 and services 252. Additionally, in an alternate embodiment of the network configuration of FIG. 6, device 100 further prevents, detects and responds to one or more security threats between controlled host 202 and controlled host 206.

Figure 7:
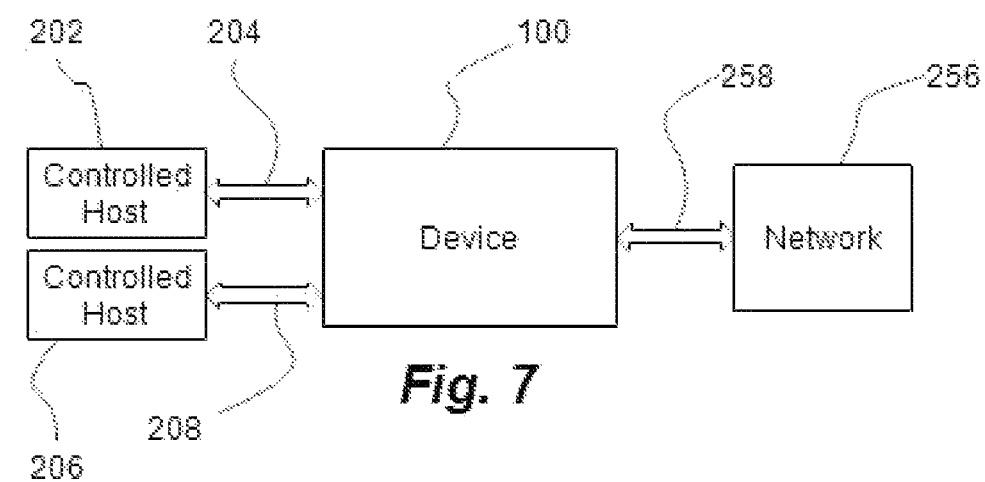
FIG. 7 is a block diagram of yet another embodiment of the invention.

FIG. 7 illustrates an embodiment of a network configuration wherein controlled host 202, controlled host 206 and network 256 are respectively connected to device 100 via communications channels 204, 208 and 258. Accordingly, device 100 prevents, detects and responds to one or more security threats between controlled host 202 and network 256 and between controlled host 206 and network 256. Additionally, in an alternate embodiment of the network configuration of FIG. 7, device 100 further prevents, detects and responds to one or more security threats between controlled host 202 and controlled host 206.

Figure 8:
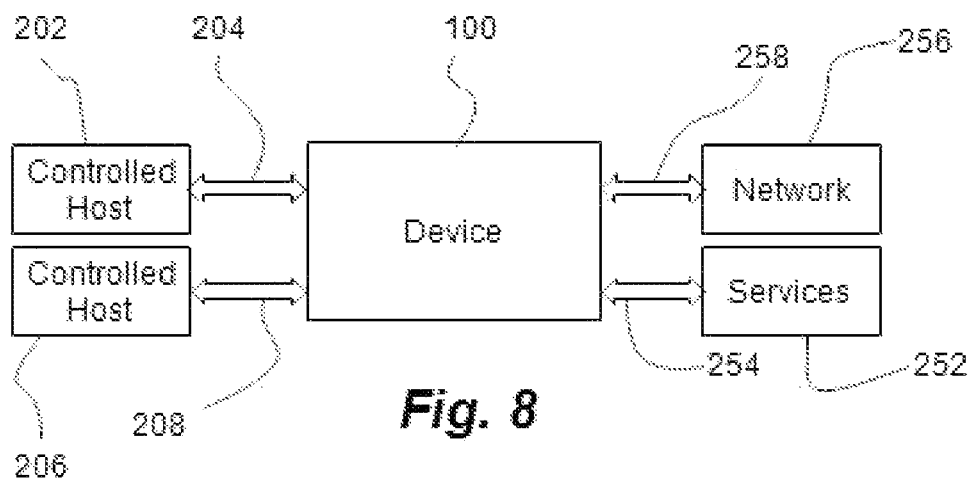
FIG. 8 is a block diagram of an alternate embodiment of the invention.

FIG. 8 illustrates another embodiment of a network configuration wherein communications channels 204, 208, 254 and 258 respectively connect device 100 to controlled host 202, controlled host 206, services 252, and network 256. Accordingly, device 100 prevents, detects and responds to one or more security threats between controlled host 202 and services 252 and network 256, and device 100 prevents, detects and responds to one or more security threats between controlled host 206 and services 252 and network 256. Additionally, in an alternate embodiment of the network configuration of FIG. 8, device 100 further prevents, detects and responds to one or more security threats, for example, between controlled host 202 and controlled host 206, between services 252 and network 256, amongst others.

As can be seen, alternate network configurations include one or more controlled host 202 even though only one such controlled host 202 has been shown and discussed with reference to some of the embodiments described in the foregoing. Controlled host 202 is one or more of a computer, a laptop, a processing device, or other device with one or more processors embedded therein. Similarly, alternate network configurations include one or more service 252 even though only one such service 252 has been shown and discussed with reference to some of the embodiments described in the foregoing. Accordingly, as used throughout this disclosure and as discussed in the foregoing, services 252 implies one or more of network 256, one or more keyboard 262, one or more network switches, one or more servers, amongst others.

Embodiments of network configurations described in the foregoing with reference to FIGS. 3 through 8, inclusive, have been limited for discussion and illustrative purposes. Additional and alternate embodiments of the various network configurations will be apparent to one skilled in the art, and all such embodiments are considered to be within the spirit, scope and intent of the present invention.

Various modifications can be made to the embodiments presented herein without departing from the spirit, scope and intent of the present invention. All such alternatives, modifications, and variations are considered as being within the spirit, scope and intent of the instant invention as defined by the appended claims and all equivalents thereof.

What is claimed is:

1. A device to prevent, detect, and respond to one or more security threats between a controlled host and one or more services used by the controlled host, the device comprising:
   a processing resource;
   one or more communication ports for connecting the device to the controlled host and for connecting the one or more services directly to the device such that communications between the one or more services and the controlled host are examined by the device,
   wherein the one or more services are one or more of a display unit, a keyboard, and a mouse
   memory for storing:
      information pertaining to one or more users permitted to use the controlled host; and
      one or more communication protocols associated with controlling the communications between the one or more services and the controlled host;
   an input device for collecting, at the device, information pertaining to a user; and
   a user authenticator for:
      comparing the information pertaining to the user with the information pertaining to the one or more user permitted to use the controlled host; and
      designating the user as one of:
         an authorized user of the controlled host if the information pertaining to the user matches the information pertaining to one or more users permitted to use the controlled host; and
         an unauthorized user of the controlled host if the information pertaining to the user does not match the information pertaining to one or more users permitted to use the controlled host,
   wherein, prior to the user authenticator designating the user as one of the authorized user and the unauthorized user, attempted communications from the one or more services to the controlled host are monitored by the device and are prevented from being received by the controlled host,
   wherein, responsive to the user authenticator designating the user as the authorized user, attempted communications from the one or more services are allowed to be received by the controlled host,
   wherein, responsive to the user authenticator designating the user as the unauthorized user, attempted communications from the one or more services are prevented from being received by the controlled host,
   wherein a characteristic of attempted communications from the one or more services to the controlled host is stored in the memory; and
   wherein the one or more communication protocols:
      in response to the user authenticator designating the user as the authorized user, authorize the communications between the one or more services and the controlled host; and
      in response to the user authenticator designating the user as the unauthorized user, prevent the communications from the one or more services from being received by the controlled host;
      log content of the attempted communications from the one or more services; and
      analyze the logged content.

2. The device of claim 1, wherein the one or more communication protocols:
   monitor attempted communications from the one or more services to the controlled host between the controlled host and the one or more services;
   filter the attempted communications based on media access control addresses;
   proxy address resolution protocol;
   apply security protocol to the attempted communications; and
   include:
      a cryptographic engine;
      a stateful internet protocol firewall;
      a network intrusion detection system; and
      a proxy server.

3. The device of claim 2, wherein the security protocol is the Internet Protocol Security (IPSec).

4. The device of claim 3, wherein the cryptographic engine:
   negotiates cryptographic keys between the controlled host and the one or more services;
   encrypts the attempted communications between the controlled host and the one or more services; and
   ensures privacy and integrity of the attempted communications.

5. The device of claim 1, wherein the one or more communication protocols comprise one or more of:
   filtering rules;
   monitoring rules;
   authorization rules; and
   proxy configurations.

6. The device of claim 1, wherein the one or more communication protocols:
   compare one or more activated communication protocols with attempted communications from the one or more services to the controlled host between the controlled host and the one or more services;
   authorize the attempted communications if the attempted communications are in compliance with the one or more activated communication protocols;
   prevent the attempted communications if the attempted communications are is not in compliance with the one or more activated communication protocols; and
   change the one or more activated communication protocols upon detecting the attempted communications comprising one or more of:
      malicious intent; and
      malformed packets.

7. The device of claim 1, wherein responsive to the user authenticator designating the user as the unauthorized user, the one or more communication protocols prevent the user from accessing the controlled host via the one or more services.

8. The device of claim 1, wherein the one or more communication ports comprise one or more of:
   a universal serial bus connection;

a serial cable connection;
a parallel cable connection; and
a wireless connection.

9. The device of claim 1, wherein the input device comprises one or more of:
a smart card reader;
a biometric device;
a retina scanner;
a finger print scanner;
a palm print scanner; and
a face scanner.

10. A method for preventing, detecting, and responding to one or more security threats between a controlled host and one or more services connected to the controlled host, the method comprising:
collecting, at a device, information pertaining to a user;
comparing the information pertaining to the user with information for one or more users permitted to use the controlled host;
designating the user as one of:
an authorized user if the information pertaining to the user matches the information pertaining to the one or more users permitted to use the controlled host; and
an unauthorized user if the information pertaining to the user does not match the information pertaining to the one or more users permitted to use the controlled host;
prior to the user being designated as one of the authorized user and the unauthorized user, monitoring attempted communications from the one or more services to the controlled host,
wherein the one or more services are connected directly to the device and include one or more of a display unit, a keyboard, and a mouse;
responsive to the user being designated as the authorized user, allowing attempted communications from the one or more services to be received by the controlled host; and
responsive to the user being designated as the unauthorized user, preventing attempted communications from the one or more services to the controlled host from being received by the controlled host;
logging content of the attempted communications from the one or more services to the controlled host; and
analyzing the logged content.

11. The method of claim 10, further comprising:
negotiating cryptographic keys between the controlled host and the one or more services;
monitoring attempted communications from the one or more services to the controlled host;
configuring the attempted communications into one or more packets;
evaluating internet protocol tables;
filtering media access control address;
applying address resolution protocol;
checking for network intrusion detection;
evaluating the one or more packets with a proxy server; and
applying security protocol to the communication.

12. The method of claim 10, further comprising:
comparing one or more configurations with attempted communications from the one or more services and the controlled host wherein the one or more configurations comprise:
a configuration associated with the user prior to being designated as one of the authorized user and the unauthorized user;
a configuration associated with the authorized user;
a configuration associated with the unauthorized user; and
a configuration for preventing malicious intent of the authorized user and the unauthorized user;
authorizing the attempted communications from the one or more services and the controlled host if the attempted communications are in compliance with the configuration associated with the authorized user;
preventing the attempted communications if the attempted communications are in compliance with the configuration associated with the unauthorized user; and
changing the one or more configurations upon detecting the attempted communications comprising one or more of:
malicious intent; and
malformed packets.

13. A device to prevent, detect, and respond to one or more security threats between a controlled host and one or more services used by the controlled host, the device comprising:
a processing resource in communication with a memory resource, wherein the memory resource includes instructions stored thereon and executable by the processing resource to:
collect, at the device, information pertaining to a user;
compare the information pertaining to the user with information for one or more users permitted to use the controlled host;
designate the user as one of:
an authorized user if the information pertaining to the user matches the information pertaining to the one or more users permitted to use the controlled host; and
an unauthorized user if the information pertaining to the user does not match the information pertaining to the one or more users permitted to use the controlled host; and
prior to the user being designated as one of the authorized user and the unauthorized user, monitor attempted communications from the one or more services to the controlled host, log content of the attempted communications from the one or more services to the controlled host, and analyze the logged content;
responsive to the user being designated as the authorized user, allow attempted communications from the one or more services to be received by the controlled host; and
responsive to the user being designated as the unauthorized user, prevent attempted communications from the one or more services from being received by the controlled host,
wherein the one or more services are connected directly to the device and include one or more of a display unit, a keyboard, and a mouse.

14. The device of claim 13, further comprising instructions executable by the processing resource to:
negotiate cryptographic keys between the controlled host and the one or more services;
configure the attempted communications into one or more packets;
evaluate internet protocol tables;
filter media access control addresses;
apply an address resolution protocol;
check for a network intrusion;

evaluate the one or more packets with a proxy server;
apply a security protocol to the attempted communications;
activate one or more communication protocols for communication between the controlled host and the one or more services through the device
compare the one or more activated communication protocols with attempted communications from the one or more services to the controlled host;
authorize attempted communications if the attempted communications are in compliance with the one or more activated communication protocols;
prevent attempted communications if the attempted communications are not in compliance with the one or more activated communication protocols; and
change the one or more activated communication protocols upon detecting attempted communications comprising one or more of:
  malicious intent; and
  malformed packets.

15. The device of claim 1, wherein the device is external to the controlled host.

16. The device of claim 1, wherein the user authenticator is for:
analyzing the characteristic of the attempted communications; and
reporting the analysis to a network security and monitoring component.

17. The method of claim 10, further comprising:
receiving communications from the controlled host;
evaluating the communications to determine whether the communications conform to a set of rules; and
delivering the communications to the one or more services on behalf of the controlled host if the communications conform to the set of rules.

* * * * *